(12) United States Patent
Ishihara et al.

(10) Patent No.: US 10,462,373 B2
(45) Date of Patent: Oct. 29, 2019

(54) IMAGING DEVICE CONFIGURED TO CONTROL A REGION OF IMAGING

(71) Applicant: CASIO COMPUTER CO., LTD., Shibuya-ku, Tokyo (JP)

(72) Inventors: Masanori Ishihara, Hamura (JP); Hiroyuki Hoshino, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/181,697

(22) Filed: Nov. 6, 2018

(65) Prior Publication Data
US 2019/0075245 A1 Mar. 7, 2019

Related U.S. Application Data

(62) Division of application No. 15/366,972, filed on Dec. 1, 2016, now abandoned.

(30) Foreign Application Priority Data

Mar. 17, 2016 (JP) .................................. 2016-053626
Jul. 8, 2016 (JP) .................................. 2016-135574

(51) Int. Cl.
*H04N 5/232* (2006.01)
*H04N 5/268* (2006.01)
(Continued)

(52) U.S. Cl.
CPC ........ *H04N 5/23296* (2013.01); *G06T 3/0012* (2013.01); *G06T 7/20* (2013.01);
(Continued)

(58) Field of Classification Search
CPC ........... H04N 5/23296; H04N 5/23293; H04N 5/268; H04N 5/265; G06T 7/20; G06T 11/60; G06F 3/0484; G06F 3/04842
(Continued)

(56) References Cited

U.S. PATENT DOCUMENTS 8,264,545 B2 9/2012 Suzuki
8,363,126 B2 1/2013 Kurokawa
(Continued)

FOREIGN PATENT DOCUMENTS

JP 06165012 A 6/1994
JP 2006303961 A 11/2006
(Continued)

OTHER PUBLICATIONS

Japanese Office Action dated Aug. 1, 2017 issued in counterpart Japanese Application No. 2016-135574.
(Continued)

*Primary Examiner* — Marly S Camargo
(74) *Attorney, Agent, or Firm* — Holtz, Holtz & Volek PC

(57) ABSTRACT

An imaging device includes an imaging unit, a display unit, and a control unit. The control unit can: make the display unit successively display an entire image taken by the imaging unit as a live-view image, set a cutting region in an imaging range of the imaging unit, displace a position of the cutting region to track movement of a specific subject, fix the position of the cutting region before a first operation, displace the position of the cutting region to track movement of the specific subject after the first operation, and display an image at a region other than the cutting region in an entire image that is successively displayed on the display unit as the live-view image, at least before the first operation, so that the other region image is less prominently displayed in a predetermined display mode than a partial image corresponding to the cutting region.

11 Claims, 10 Drawing Sheets

(51) Int. Cl.
- *G06T 7/20* (2017.01)
- *G06T 11/60* (2006.01)
- *G06F 3/048* (2013.01)
- *H04N 5/262* (2006.01)
- *H04N 5/265* (2006.01)
- *G06T 3/00* (2006.01)

(52) U.S. Cl.
CPC ......... *G06T 11/60* (2013.01); *H04N 5/23293* (2013.01); *H04N 5/265* (2013.01); *H04N 5/2628* (2013.01)

(58) Field of Classification Search
USPC ..... 348/333.01, 333.05, 222.1, 220.1, 221.1, 348/362, 239, 169, 208.14, 208.13, 208.4; 382/103, 118, 283, 286, 282, 276, 291
See application file for complete search history.

(56) References Cited

U.S. PATENT DOCUMENTS

| | | | |
|---|---|---|---|
| 8,767,093 B2 | 7/2014 | Kuriyama et al. | |
| 2005/0270399 A1* | 12/2005 | Kawaguchi | H04N 5/23212 348/333.1 |
| 2007/0279492 A1 | 12/2007 | Ohnishi | |
| 2008/0186386 A1* | 8/2008 | Okada | H04N 5/228 348/208.6 |
| 2008/0239092 A1 | 10/2008 | Sugino et al. | |
| 2009/0080801 A1* | 3/2009 | Hatfield | G06K 9/36 382/283 |
| 2009/0316016 A1* | 12/2009 | Iwamoto | H04N 5/23219 348/222.1 |
| 2011/0242369 A1 | 10/2011 | Misawa et al. | |
| 2011/0310274 A1 | 12/2011 | Kuriyama | |
| 2012/0206619 A1 | 8/2012 | Nitta et al. | |
| 2013/0155308 A1 | 6/2013 | Wu et al. | |
| 2016/0173759 A1* | 6/2016 | Nakamura | H04N 5/23212 348/222.1 |

FOREIGN PATENT DOCUMENTS

| | | | |
|---|---|---|---|
| JP | 2007096588 A | 4/2007 | |
| JP | 2007166011 A | 6/2007 | |
| JP | 2009186914 A | 8/2009 | |
| JP | 2010232962 A | 10/2010 | |
| JP | 2012009915 A | 1/2012 | |
| JP | 2012124916 A | 6/2012 | |
| JP | 201405022 * | 3/2014 | ............ H04N 5/225 |
| JP | 2014050022 A | 3/2014 | |

OTHER PUBLICATIONS

Japanese Office Action dated Jan. 9, 2018 issued in counterpart Japanese Application No. 2016-135574.

* cited by examiner

IMAGING DEVICE CONFIGURED TO CONTROL A REGION OF IMAGING

CROSS REFERENCE TO RELATED APPLICATIONS

This application is a Divisional application of U.S. application Ser. No. 15/366,972, filed Dec. 1, 2016, which is based on and claims priority under 35 U.S.C. § 119 to Japanese Patent Application Nos. JP 2016-053626, filed Mar. 17, 2016, and JP 2016-135574, filed Jul. 8, 2016. The entire contents of all the above-identified applications are incorporated herein by reference.

BACKGROUND OF THE INVENTION

1. Field of the Invention

The present invention relates to an imaging device configured to control a region of imaging, and such imaging method and program.

2. Description of the Related Art

Conventionally an imaging device equipped with a digital-zooming function has been known, which is configured to cut a part of the entire taken image on the scale for zooming, enlarge the image to display it on a monitor screen, and record the image in accordance with the shooting instruction. A technique of reducing a wide-angle image before zooming in size and displaying it on a part of the monitor screen in a synthetic manner also has been known (see Patent Document 1, for example).

Patent Document 1: JP-A-2010-232962

SUMMARY OF THE INVENTION

According to one aspect of the present invention, an imaging device includes: an imaging unit; a display unit; and a control unit. The control unit is configured to: set a first region of a predetermined size at a predetermined position in an imaging range of the imaging unit; make the display unit display an image in the first region as live-view image; fix a position of the first region in the imaging range before a first operation is performed; after the first operation is performed, displace the position of the first region in the imaging range so as to track movement of a specific subject in the imaging range; and when a second operation is performed, following the first operation, record a partial image corresponding to the first region in an entire image taken by the imaging unit.

According to another aspect of the present invention, an imaging method by an imaging device, includes: setting a first region of a predetermined size at a predetermined position in an imaging range of an imaging unit; making a display unit an image in the set first region as live-view image; fixing a position of the first region in the imaging range before a first operation is performed; after the first operation is performed, displacing the position of the first region in the imaging range so as to track movement of a specific subject in the imaging range; and when a second operation is performed, following the first operation, recording a partial image corresponding to the first region in an entire image taken by the imaging unit.

According to another aspect of the present invention, a non-transitory recording medium includes a program recorded therein, the program making a computer of an imaging unit: set a first region of a predetermined size at a predetermined position in an imaging range of an imaging unit; make a display unit an image in the set first region as live-view image; fix a position of the first region in the imaging range before a first operation is performed; after the first operation is performed, displace the position of the first region in the imaging range so as to track movement of a specific subject in the imaging range; and when a second operation is performed, follow the first operation, record a partial image corresponding to the first region in an entire image taken by the imaging unit.

DETAILED DESCRIPTION OF THE INVENTION

The following describes specific embodiments of the present invention, with reference to the drawings. The scope of the invention is not limited to the illustrated examples.

Embodiment 1

Figure 1:
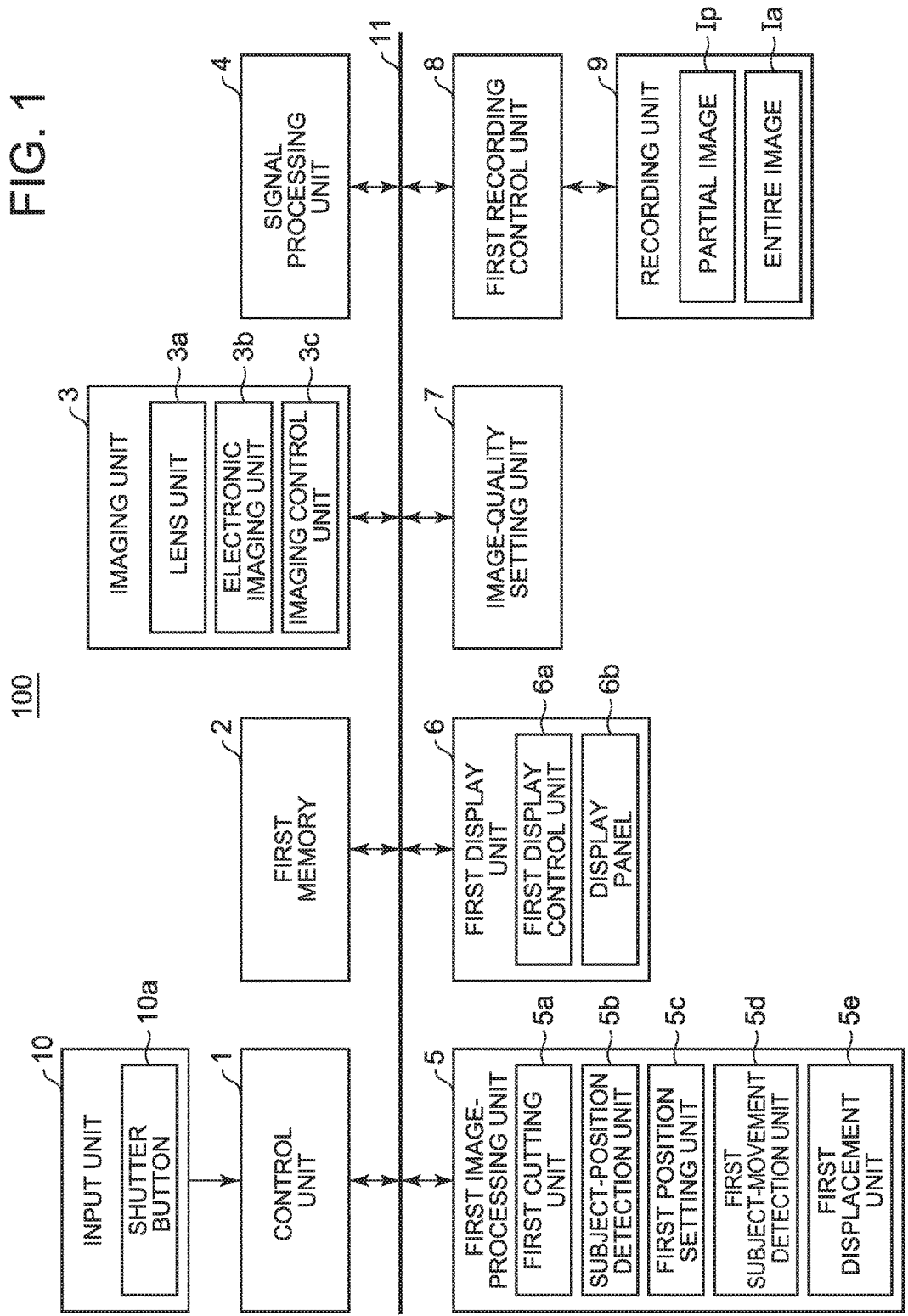
FIG. 1 is a block diagram schematically showing the configuration of an imaging device of Embodiment 1 of the present invention.

FIG. 1 is a block diagram schematically showing the configuration of an imaging device 100 of Embodiment 1 of the present invention.

As shown in FIG. 1, the imaging device 100 in Embodiment 1 specifically includes a control unit 1, a first memory 2, an imaging unit 3, a signal processing unit 4, a first image-processing unit 5, a first display unit 6, an image-quality setting unit 7, a first recording control unit 8, a recording unit 9, and an input unit 10.

The control unit 1, the first memory 2, the imaging unit 3, the signal processing unit 4, the first image-processing unit 5, the first display unit 6, the image-quality setting unit 7 and the first recording control unit 8 are connected via a bus line 11.

The control unit 1 is configured to control various units of the imaging device 100. Although not illustrated, the control unit 1 specifically includes a CPU (Central Processing Unit)

or the like to control the units variously in accordance with various types of processing programs (not illustrated) for the imaging device 100.

The first memory 2 includes a DRAM (Dynamic Random Access Memory), for example, and temporarily stores data or the like processed by the control unit 1, the first image-processing unit 5 and the like.

The imaging unit 3 is configured to take an image of a subject at any frame rate and create a frame image. Specifically the imaging unit 3 includes a lens unit 3*a*, an electronic imaging unit 3*b*, and an imaging control unit 3*c*.

The lens unit 3*a* includes a plurality of lenses such as a zoom lens and a focus lens, and a diaphragm to adjust the amount of light passing through the lenses.

The electronic imaging unit 3*b* includes an image sensor (imaging device), such as a CCD (Charge Coupled Device) or a CMOS (Complementary Metal-Oxide Semiconductor). The electronic imaging unit 3*b* is configured to convert an optical image passing through the various types of lenses of the lens unit 3*a* into a two-dimensional image signal.

The imaging control unit 3*c* scan-drives the electronic imaging unit 3*b* using a timing generator or a driver so as to make the electronic imaging unit 3*b* convert an optical image passed through the lens unit 3*a* into a two-dimensional image signal in a predetermined cycle, and reads frame images one by one from the imaging region of the electronic imaging unit 3*b* to output them to the signal processing unit 4.

The imaging control unit 3*c* may control to adjust the conditions for imaging of a subject, such as AF (automatic focusing), AE (automatic exposure), and AWB (automatic white balance).

The signal processing unit 4 performs various types of processing of frame image signals having analogue values that are transferred from the electronic imaging unit 3*b*. Specifically the signal processing unit 4 adjusts the gain of frame image signals having analogue values for each color component of RGB as needed, samples and holds them using a sample-and-hold circuit (not illustrated) and converts them into digital data by an A/D converter (not illustrated), and performs color-processing of them by a color process circuit (not illustrated), including pixel interpolation and γ-correction to create a brightness signal Y and a color-difference signal Cb, Cr (YUV data) having a digital value. The signal processing unit 4 outputs such created brightness signal Y and color-difference signal Cb, Cr to the first memory 2 as a buffer memory.

The first image-processing unit 5 includes a first cutting unit 5*a*, a subject-position detection unit 5*b*, a first position setting unit 5*c*, a first subject-movement detection unit 5*d* and a first displacement unit 5*e*.

Each unit of the first image-processing unit 5 includes a predetermined logic circuit, for example, and the configuration is given for illustration and is not intended to limit the invention.

Figure 3A:
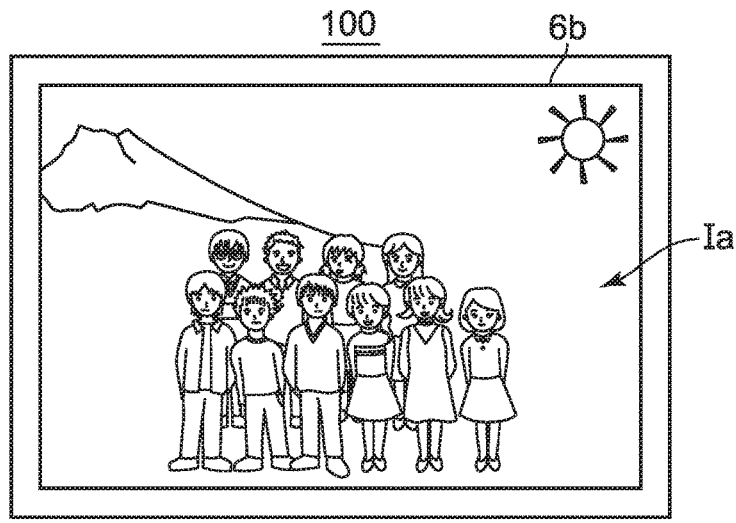
FIGS. 3A to 3C explain the shooting processing in FIG. 2.

The first cutting unit 5*a* is configured to cut a partial cutting region A from the entire image Ia (see FIG. 3A).

Figure 3B:
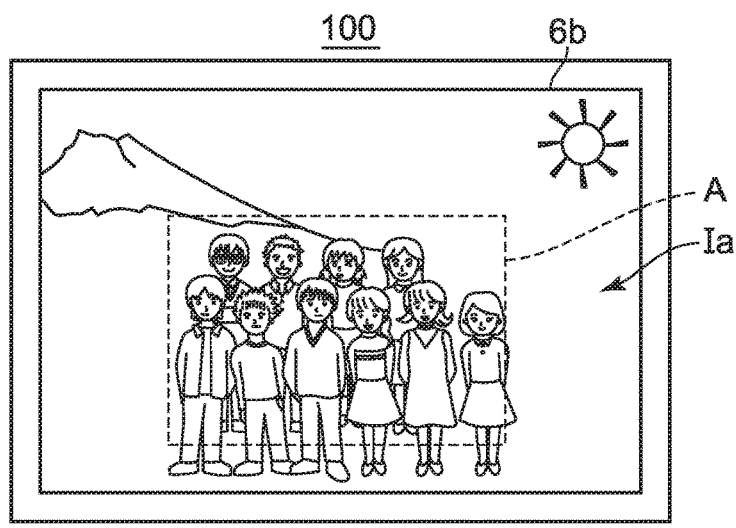

That is, the first cutting unit 5*a* acquires, from the first memory 2, YUV data of the entire image Ia that is an image of a subject taken by the imaging unit 3 and is created by the signal processing unit 4, and cuts image data corresponding to the partial cutting region A of the entire image Ia on the scale for zooming (see FIG. 3B). Specifically, when the user presses a shutter button 10*a* of the input unit 10 halfway (first operation), the first cutting unit 5*a* cuts the partial cutting region A from the entire image Ia on the scale for zooming (e.g., twice each of the height and the width) that is predetermined before the halfway-pressing and at the cutting position set by the first position setting unit 5*c* described later.

The partial cutting region A on the scale for zooming refers to a region where imaging is possible when the partial region of the entire image Ia is zoomed-in by digital-zooming or optical zooming, for example. For instance, in the case of scale for zooming that is twice each of the height and the width, the cutting region A will be the region of ¼ in area of the entire image Ia. When a partial image Ip of the cutting region A is displayed on the entire of the display panel 6*b* of the first display unit 6, the cutting region A is zoomed in and the enlarged partial image Ip is displayed.

The entire image Ia refers to the original image before cutting of the partial cutting region on the scale for zooming, which may not be an image corresponding to all of the pixels of the image sensor (imaging device).

After halfway-pressing of the shutter button 10*a* by the user, the scale for zooming corresponding to the partial cutting region A that is cut by the first cutting unit 5*a* may be changed. That is, after cutting the partial cutting region A from the entire image Ia on the scale for zooming (e.g., twice each of the height and the width) that is predetermined before the halfway-pressing of the shutter button 10*a*, a user is allowed to change the size of the cutting region A by adjusting the scale for zooming through a predetermined operation of the zoom button described later of the input unit 10 (see FIG. 4A and FIG. 4B).

Figure 4A:
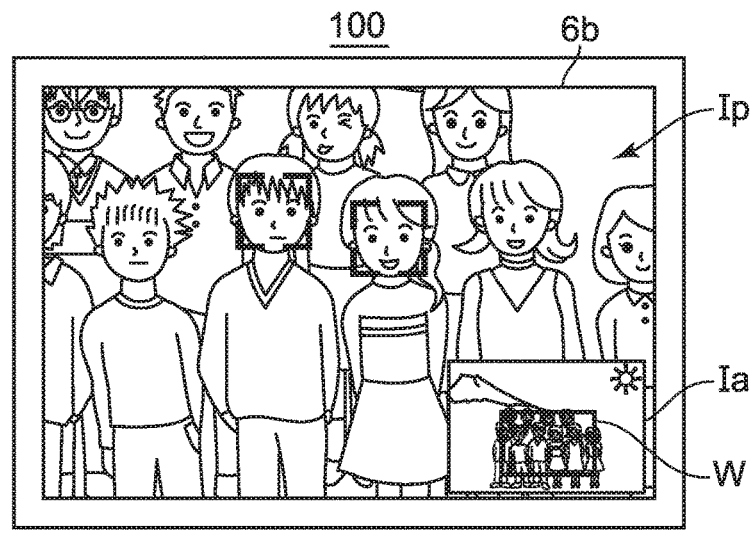
FIGS. 4A and 4B explain the shooting processing in FIG. 2.
Figure 4B:
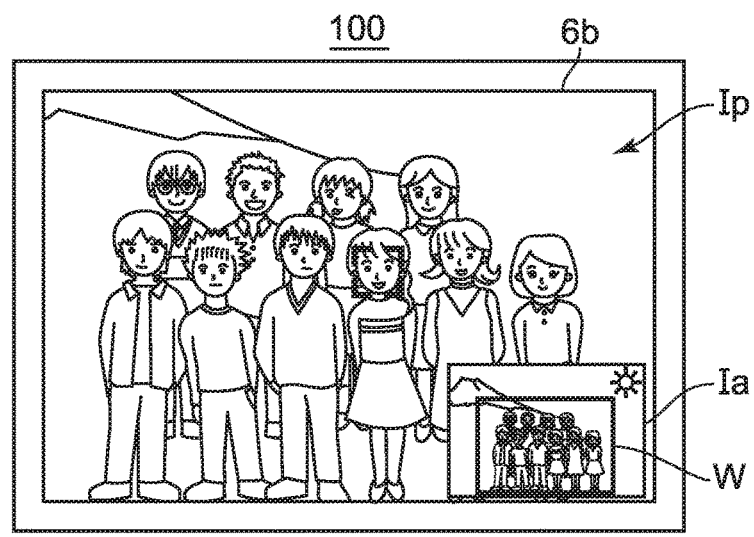

FIG. 4A schematically shows a larger scale for zooming, i.e., smaller cutting region A, and FIG. 4B schematically shows a smaller scale for zooming, i.e., larger cutting region A.

The subject-position detection unit 5*b* detects the position of a specific subject.

Figure 3C:
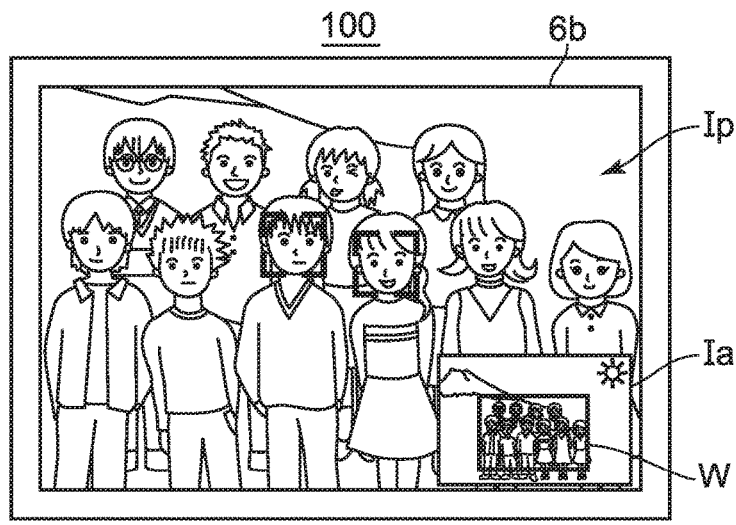

That is, the subject-position detection unit 5*b* detects the position of a specific subject in the angle of view taken by the imaging unit 3. Specifically feature information to recognize a specific subject (e.g., face image of the specific subject) is recorded beforehand in the recording unit 9, for instance, and the subject-position detection unit 5*b* performs subject recognition in the entire image Ia taken by the imaging unit 3 by collating with the feature information recorded in the recording unit 9 so as to detect the specific subject (see FIG. 3B). At this time, the specific subject may be detected from a predetermined range with reference to a predetermined position (e.g., substantially center) of the entire image Ia (angle of view). Alternatively, a subject present in a predetermined range with reference to a predetermined position (e.g., substantially center) of the entire image Ia (angle of view) at a user's designated timing (e.g., when the user presses the shutter button 10*a* halfway) may be set as a specific subject, and an image of this part may be acquired as feature information and may be recorded temporarily. Then, movement of the image (feature information) recorded temporarily may be detected. In FIG. 3B and FIG. 3C (described later), a face-detection frame is overlapped on the position of the face of each specific subject detected on the display, and this is given for illustration and is not intended to limit the invention. Overlapping of such a face-detection frame on the display is a matter which can be changed as needed.

Then, when the specific subject is detected by the processing as stated above, the subject-position detection unit 5*b* detects the position (e.g., XY coordinates) of the specific subject in the entire image Ia.

The specific subject is not limited to the one detected by the processing as stated above, which may be a subject having a largest face among those detected through the face-detection processing (the subject at the closet distance).

The first position setting unit 5c sets the cutting position of the cutting region A.

That is, when the user presses the shutter button 10a halfway, the first position setting unit 5c sets the position of the specific subject detected by the subject-position detection unit 5b as the cutting position of the cutting region A to be cut by the first cutting unit 5a.

Specifically, when the user presses the shutter button 10a halfway, for example, and then the subject-position detection unit 5b detects a specific subject present at a predetermined position (e.g., substantially center) in the angle of view or detects a specific subject from the angle of view by the subject-recognition processing as stated above, the first position setting unit 5c sets the cutting position with reference to the position of the specific subject detected so that the specific subject is included in the cutting region A. For instance, the first position setting unit 5c sets the cutting position so that the specific subject detected is located at a predetermined position (e.g., substantially center) of the cutting region A.

The first subject-movement detection unit 5d detects movement of the specific subject.

That is, the first subject-movement detection unit 5d detects relative movement of the specific subject with reference to the angle of view taken by the imaging unit 3. Specifically the first subject-movement detection unit 5d performs processing of YUV data of a plurality of frame images successively taken by the imaging unit 3 and created by the signal processing unit 4, such as the subject-recognition processing by the subject-position detection unit 5b as stated above or mobile body tracking processing based on information for tracking of a specific subject detected once (e.g., feature points, brightness information, and color information) and thereby successively detects the specific subject from each frame image. Thereby, the first subject-movement detection unit 5d detects the relative movement of the specific subject that is generated when the imaging device 100 moves due to hand movement, for example, or when the specific subject itself moves.

When the movement of the specific subject relative to the angle of view for shooting is detected, if the specific subject is not a mobile body, such a specific subject will move with another subject (e.g., the background as a whole) in the angle of view. Therefore, the movement of such other subject (e.g., the background as a whole) in the angle of view for shooting may be detected, whereby the movement of the specific subject can be detected.

The first displacement unit 5e displaces the cutting position of the cutting region A in the entire image Ia in accordance with the relative movement of the specific subject.

That is, after halfway-pressing of the shutter button 10a by the user, the first displacement unit 5e displaces the cutting position of the cutting region A to be cut by the first cutting unit 5a in accordance with the relative movement of the specific subject detected by the first subject-movement detection unit 5d. Specifically the first displacement unit 5e displaces, in accordance with the relative movement of the specific subject, the cutting position of the cutting region A in the entire image Ia that is set by the first position setting unit 5c with reference to the position of the specific subject. For instance, in the case where the first position setting unit 5c sets the cutting position so that the specific subject is located at a substantially center of the cutting region A, even when the first subject-movement detection unit 5d detects relative movement of the specific subject in the angle of view, the position of the specific subject in the cutting region A does not change because the first displacement unit 5e displaces the cutting position of the cutting region A in accordance with the relative movement of the specific subject.

Figure 5A:
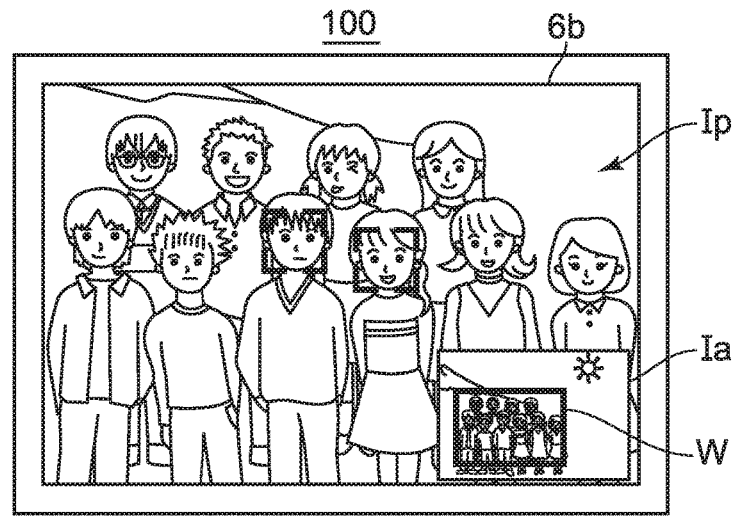
FIGS. 5A and 5B explain the shooting processing in FIG. 2.
Figure 5B:
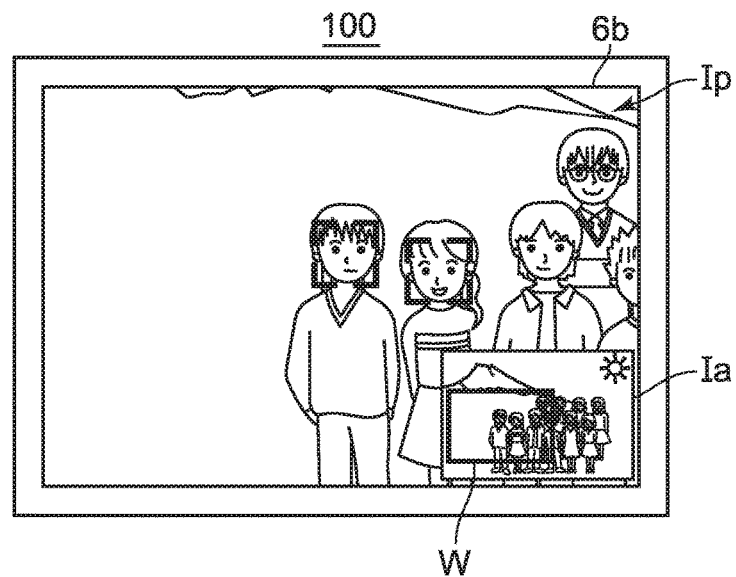

For instance, when the first subject-movement detection unit 5d tracks the feature points of the specific subject and calculates motion vector of the specific subject, the first displacement unit 5e performs a first operation to displace the cutting position of the cutting region A based on the calculated motion vector of the specific subject (see FIG. 5A). When the first subject-movement detection unit 5d performs subject recognition, for example, the first displacement unit 5e performs a second operation to displace the cutting position of the cutting region A based on the movement of the position of the recognized specific subject (see FIG. 5B). Rotation of the imaging device 100 may be detected by an angular speed sensor or the like (not illustrated) in the pitch direction, the yaw direction and the roll direction relative to the optical axis of the lens unit 3a, and the first displacement unit 5e may perform a third operation to displace the cutting position of the cutting region A based on the detected rotating direction or rotating amount.

The first displacement unit 5e may perform the first to the third operations as stated above by switching manually or automatically.

For instance, when the first to the third operations are switched automatically, the first displacement unit 5e may switch between the second operation and the first operation or the third operation based on whether, in the subject-recognition processing, a specific subject is present or not in the angle of view, whose feature information (face image of the specific subject, for example) for recognizing the specific subject is recorded beforehand in the recording unit 9. Alternatively the first displacement unit 5e may switch between the second operation and the first operation or the third operation based on whether the specific subject is a mobile body or not from the result of the mobile-body tracking. Still alternatively, when any speed to displace the imaging device 100 by the user is detected by an angular speed sensor (not illustrated), the first displacement unit 5e may switch between the third operation and the first operation or the second operation based on whether the detected speed exceeds a predetermined speed or not.

The first displacement unit 5e may displace the cutting position of the cutting region A by a composite control including the combination of at least two of the first to the third operations.

The first display unit 6 includes a first display control unit 6a and a display panel 6b.

The first display control unit 6a controls to display a predetermined image on a display region of the display panel 6b in accordance with image data of a predetermined size that is read from the first memory 2 and the recording unit 9 and is decoded by the first image-processing unit 5. Specifically, the first display control unit 6a includes a VRAM (Video Random Access Memory), a VRAM controller, a digital video encoder and the like. The digital video encoder reads, from the VRAM, the brightness signal Y and the color-difference signal Cb, Cr that are decoded by the first image-processing unit 5 and are recorded in the VRAM at a predetermined reproduction frame rate via the VRAM controller, and generates a video signal based on these data to output them to the display panel 6b. The first image-processing unit 5 may change the size of image data into a predetermined size (e.g., full-HD size) based on the resolution of the display panel 6b or the like.

In the mode of shooting static images and moving images, the first display control unit 6a makes the display panel 6b display live-view image while updating a plurality of frame images of the entire image Ia that are successively taken by the imaging unit 3 at a predetermined reproduction frame rate. When the user further presses the shutter button 10a halfway, the first display control unit 6a changes the live-view image that is successively displayed on the display panel 6b from the entire image Ia to the partial image Ip corresponding to the cutting region A cut by the first cutting unit 5a for displaying (see FIG. 3C). That is, the first display control unit 6a makes the display panel 6b display, as the live-view image, the partial image Ip corresponding to the cutting region A that is successively cut by the first cutting unit 5a.

When successively displaying the partial image Ip as the live-view image on the display panel 6b, the first display control unit 6a displays the entire image Ia taken by the imaging unit 3 that is reduced in size at a predetermined position of the partial image Ip being displayed in a successively-synthesized manner (see FIG. 3C). At this time, the first display control unit 6a may display the frame W indicating the cutting region A cut by the first cutting unit 5a, for example, in the entire image Ia reduced in size that is synthesized at the predetermined position of the partial image Ip, so that the cutting region A becomes recognizable.

FIG. 3C shows an example where the entire image Ia reduced in size is displayed in a synthesized manner at the lower right corner of the partial image Ip, and the synthesized position of the entire image Ia is not limited to this and may be changed as needed.

The display panel 6b displays an image taken by the imaging unit 3, for example, in the display region in accordance with video signals from the first display control unit 6a. When the partial image Ip and the entire image Ia are associated and recorded in the first recording control unit 8, the display panel 6b may reproduce these partial image Ip and entire image Ia while switching them. When these partial image Ip and entire image Ia are reproduced while being switched, the effect that is performed typically during slide-show reproduction, such as zoom-in/zoom-out, may be used.

Examples of the display panel 6b include a liquid crystal display panel and an organic EL (Electro-Luminescence) display panel, and they are given for illustration and are not intended to limit the invention.

The image-quality setting unit 7 sets the quality of image to be recorded in the recording unit 9.

For instance, in the case of compression in the JPEG format, the quality of image changes with the compression ratio. Therefore the image-quality setting unit 7 sets the compression ratio (e.g., ½, ¼) of the partial image Ip and the entire image Ia to be recorded in the recording unit 9 in accordance with a predetermined operation of the input unit 10 by the user, thus setting the quality of image of the partial image Ip and the entire image Ia.

The first recording control unit 8 controls reading of data from the recording unit 9 and writing of data to the recording unit 9.

That is, the first recording control unit 8 records image data for recording images that are encoded in a predetermined compression format (e.g., JPEG format) in the recording unit 9, and the recording unit 9 includes a non-volatile memory (flash memory) or a recording medium, for example. Specifically, when the user presses the shutter button 10a fully (a second operation different from the first operation), the first recording control unit 8 records the partial image Ip corresponding to the cutting region A cut by the first cutting unit 5a in the recording unit 9. Then the first recording control unit 8 associates the partial image Ip corresponding to the cutting region A cut by the first cutting unit 5a and the entire image Ia taken by the imaging unit 3 and records them in the recording unit 9 (see FIG. 1).

The first recording control unit 8 can make a selection between the recording of both of the partial image Ip and the entire image Ia and the recording of any one of the images. For instance, in the case where a predetermined shooting mode is set to associate the partial image Ip and the entire image Ia for recording, when the user presses the shutter button 10a fully, the first recording control unit 8 associates the partial image Ip corresponding to the cutting region A cut by the first cutting unit 5a and the entire image Ia taken by the imaging unit 3 at the same timing as the cutting of the cutting region A, i.e., the entire image Ia from which the partial image Ip is cut, and records these images in the recording unit 9.

At this time, the first recording control unit 8 compresses the partial image Ip and the entire image Ia separately, and records these images as different files in the recording unit 9. That is, the first recording control unit 8 compresses the partial image Ip and the entire image Ia separately with the compression ratio corresponding to the same image of quality set by the image-quality setting unit 7 or with different compression ratios corresponding to mutually different qualities of image, and records these images as different files in the recording unit 9. When the partial image Ip and the entire image Ia have mutually different qualities of image, the first recording control unit 8 is configured to compress these images with compression ratios such that the entire image Ia has a lower quality of image than that of the partial image Ip, and records these images as different files in the recording unit 9.

The input unit 10 is to allow the user to perform a predetermined operation of the imaging device 100. Specifically the input unit 10 includes the following buttons for shooting instructions of a subject, including the shutter button 10a that enables the operation at two stages of the halfway-pressing operation (first operation) and the fully-pressing operation (second operation), a selection and decision button (not illustrated) to select a shooting mode, functions and the like, and a zoom button (not illustrated) to adjust the degree of zooming.

When the user manipulates these buttons, the input unit 10 outputs an operation signal in accordance with the manipulated button to the control unit 1. The control unit 1 makes various units execute a predetermined operation (e.g., shooting of a static image) in accordance with the operation instruction input from the input unit 10.

<Shooting Processing>

Referring next to FIGS. 2 to 5B, the following describes shooting processing by the imaging device 100.

Figure 2:
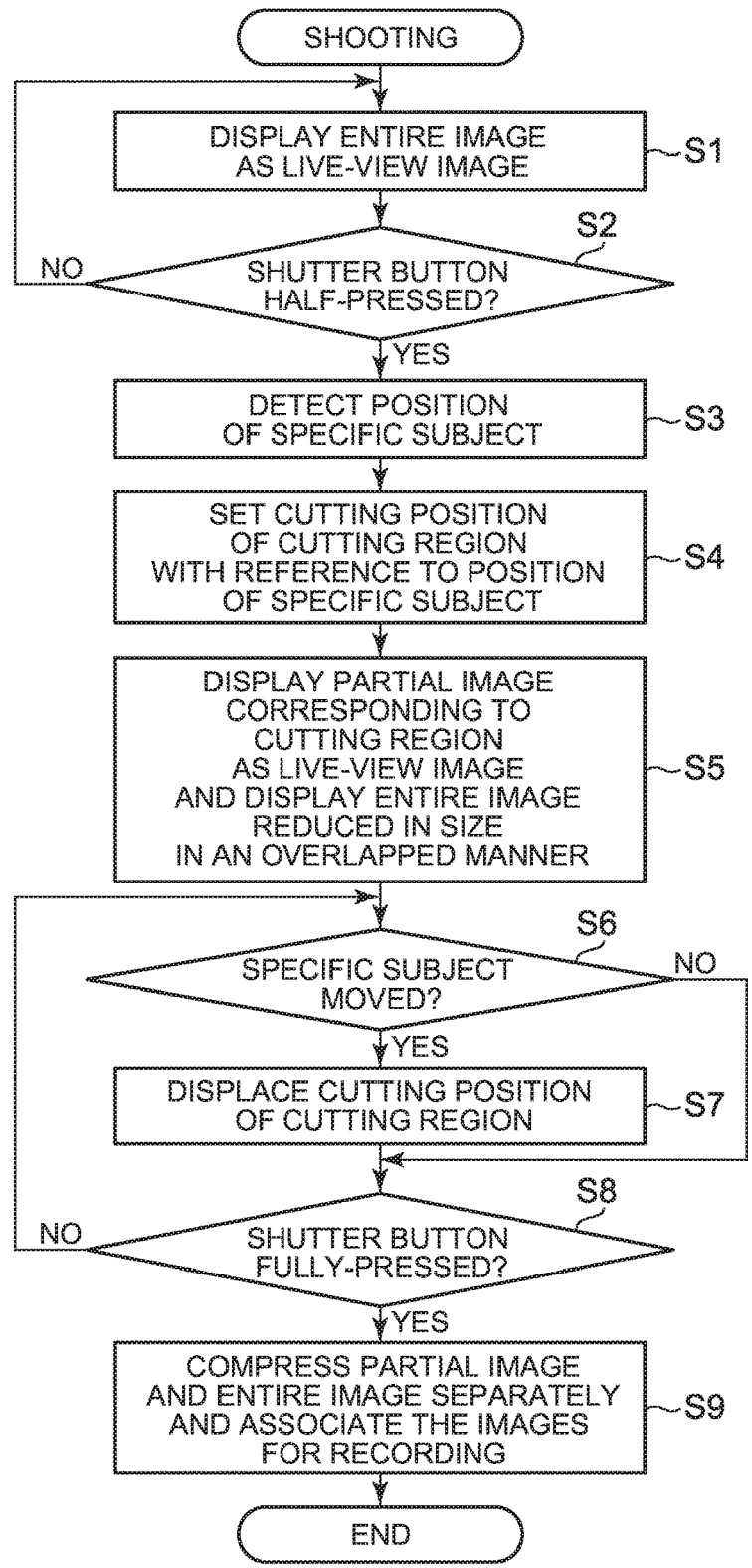
FIG. 2 is a flowchart showing one example of the operation in the shooting processing by the imaging device of FIG. 1.

FIG. 2 is a flowchart showing one example of the operation in the shooting processing. FIGS. 3A to 5B explain the shooting processing.

In the shooting processing in the following, the image-quality setting unit 7 sets the compression ratios (e.g., ½, ¼) of the partial image Ip and the entire image Ia beforehand. In the following shooting processing, a predetermined shooting mode is set to associate the partial image Ip and the entire image Ia for recording.

As shown in FIG. 2, the imaging unit 3 firstly starts imaging of a subject, and the first display control unit 6a makes the display panel 6b display live-view image based on image data for displaying a plurality of frame images of the entire image Ia created by the signal processing unit 4 (Step S1).

Thereafter the CPU of the control unit 1 determines whether the user presses the shutter button 10a of the input unit 10 halfway or not (Step S2).

When it is determined that the user does not press the shutter button 10a halfway (Step S2; No), the CPU of the control unit 1 returns the processing to Step S1, and similarly to the above, the first display control unit 6a makes the display panel 6b display live-view image.

When it is determined at Step S2 that the user presses the shutter button 10a halfway (Step S2; Yes), the subject-position detection unit 5b performs subject-recognition processing using feature information for recognizing a specific subject that is recorded beforehand in the recording unit 9 to detect the position of the specific subject in the angle of view taken by the imaging unit 3 (Step S3). Subsequently the first position setting unit 5c sets the cutting position with reference to the position of the specific subject detected by the subject-position detection unit 5b so that the specific subject is included in the cutting region A (Step S4).

Thereafter the first cutting unit 5a successively cuts image data corresponding to the partial cutting region A from the YUV data of the entire image Ia created by the signal processing unit 4 on the scale for zooming that is predetermined before the halfway-pressing and at the cutting position set by the first position setting unit 5c. The first display control unit 6a makes the display panel 6b display, as the live-view image, the partial image Ip corresponding to the cutting region A that is successively cut by the first cutting unit 5a (Step S5). At this time, the first display control unit 6a displays the entire image Ia that is taken by the imaging unit 3 and is reduced in size in a successively-synthesized manner at a predetermined position (e.g., the lower right corner) of the partial image Ip being displayed (see FIG. 3C).

Subsequently, the first subject-movement detection unit 5d performs subject-recognition processing or mobile-body tracking processing, for example, to determine whether relative movement of the specific subject in the angle of view taken by the imaging unit 3 is detected or not (Step S6).

When it is determined that relative movement of the specific subject is detected (Step S6; Yes), the first displacement unit 5e displaces the cutting position of the cutting region A to be cut by the first cutting unit 5a in accordance with the movement of the specific subject detected by the first subject-movement detection unit 5d, specifically based on the motion vector of the specific subject or the movement of the recognition position of the specific subject, for example (Step S7).

Thereafter, the CPU of the control unit 1 determines whether the user presses the shutter button 10a of the input unit 10 fully or not (Step S8). When it is determined at Step S6 that the relative movement of the specific subject is not detected (Step S6; No) as well, the CPU of the control unit 1 shifts the processing to Step S8 to determine whether the user presses the shutter button 10a fully or not.

When it is determined that the user does not press the shutter button 10a fully (Step S8; No), the CPU of the control unit 1 returns the processing to Step S6, and similarly to the above, the first subject-movement detection unit 5d determines whether relative movement of the specific subject is detected or not.

When the fully-pressing operation of the shutter button 10a is not performed and the halfway-pressing operation of the shutter button 10a is canceled, the CPU of the control unit 1 returns the processing to Step S1, and similarly to the above, the first display control unit 6a makes the display panel 6b display live-view image.

When it is determined at Step S8 that the user presses the shutter button 10a fully (Step S8; Yes), the first cutting unit 5a cuts image data corresponding to the partial cutting region A set in the entire image Ia from the YUV data of the entire data Ia created by the signal processing unit 4, and the first recording control unit 8 compresses the partial image Ip corresponding to the cutting region A cut by the first cutting unit 5a and the entire image Ia from which the cutting region A is cut separately to be in different files, and associate them and record them in the recording unit 9 (Step S9).

In this way, the shooting processing ends.

As stated above, the imaging device 100 of Embodiment 1 is configured so that, when the user presses the shutter button 10a halfway, the successively displayed live-view image is changed from the entire image Ia to the partial image Ip corresponding to the partial cutting region A for displaying. After the halfway-pressing of the shutter button 10a, the cutting position of the cutting region A is displaced in accordance with the relative movement of the specific subject. When the user presses the shutter button 10a fully, the partial image Ip corresponding to the cutting region A cut out is recorded. With this configuration, when the user presses the shutter button 10a halfway, the user can recognize the partial image Ip corresponding to the partial cutting region A on the scale for zooming as the live-view image. Further, even if the specific subject moves in the angle of view, the user is not required to adjust the composition of the image because the cutting position of the cutting region A is displaced in accordance with the movement of the specific subject in the angle of view. In this way, a user can use the digital-zooming function of the imaging device 100 more easily.

Before halfway-pressing of the shutter button 10a, the user is allowed to freely change a specific subject as the target of cutting by changing the angle of view. The user can decide a specific subject as the target of cutting at the timing when the user presses the shutter button 10a halfway, and while the user keeps the halfway-pressing, the user can track (fix) the specific subject decided as the target of cutting even when the angle of view is changed. Therefore the user can easily change, decide, and track (fix) the specific target as the target of cutting. When the user wants to record an image while keeping the halfway-pressing of the shutter button 10a, the user can simply press the shutter button 10a fully. When the user wants to change the specific subject as the target of cutting, the user can simply cancel the halfway-pressing of the shutter button 10a. In this way, quick operations including the recording of an image are enabled.

When a predetermined shooting mode is set to associate the partial image Ip and the entire image Ia for recording, for example, the partial image corresponding to the cutting region A and the entire image Ia taken at the same timing as the cutting of the cutting region A are associated and recorded. Whereby, the positional relationship of the partial image Ip with the entire image Ia can be easily understood.

At a predetermined position of the partial image Ip corresponding to the cutting region A that is successively displayed as live-view image, the entire image Ia that is taken by the imaging unit 3 and is reduced in size can be displayed in a successively-synthesized manner. Specifically the cutting region A cut out can be recognizably displayed in the entire image Ia that is reduced in size and is synthesized at a predetermined position of the partial image Ip. Thereby the positional relationship of the partial image Ip in the entire image Ia can be easily understood.

When the halfway-pressing of the shutter button 10a is performed, the position of the specific subject detected in the angle of view is set as the cutting position of the cutting region A. Therefore the cutting position of the cutting region A can be set with reference to the position of the specific subject. For instance, the cutting position of the cutting region A can be set with reference to the position of the specific subject present at a predetermined position in the angle of view or the position of the specific subject recognized in the angle of view when the halfway-pressing of the shutter button 10a is performed.

Since the set cutting position of the cutting region A is displaced in accordance with the relative movement of the specific subject, even if the specific subject moves relative to the angle of view, the user is not required to adjust the composition of the image. For instance, the cutting position of the cutting region A can be displaced so as to track the specific subject based on the motion vector of the specific subject or the movement of the recognition position of the specific subject, for example. The cutting position of the cutting region A can be displaced so as to track the specific subject based on the rotation of the imaging device 100 with reference to the optical-axis direction of the lens unit 3a.

The operation to displace the cutting position of the cutting region A can be switched before execution. For instance, the cutting position of the cutting region A may be displaced by a more suitable method based on whether a specific subject whose feature information for recognizing the specific subject is recorded beforehand is present in the angle of view or not, or based on the speed or the like to displace the imaging device 100 by the user. Whereby, even when the specific subject moves in the angle of view, the cutting position of the cutting region A can be displaced so as to track the specific subject.

The cutting region A is cut from the entire image Ia on the scale for zooming that is predetermined before the halfway-pressing of the shutter button 10a. This can eliminate a special operation by the user before shooting. Further after halfway-pressing of the shutter button 10a, the scale for zooming can be changed so as to correspond to the cutting region A. Thereby the size of the cutting region A can be changed with consideration given to the composition of the partial image Ip, for example.

Since the partial image Ip and the entire image Ia are compressed separately and recorded in different files, the partial image Ip and the entire image Ia can be managed separately. At this time, the partial image Ip and the entire image Ia can be compressed separately with the compression ratio corresponding to the same image of quality set by the image-quality setting unit 7 or with different compression ratios corresponding to mutually different qualities of image (e.g., the compression ratios such that the entire image Ia has a lower quality of image than that of the partial image Ip), and can be recorded in different files.

The partial image Ip and the entire image Ia that are associated and recorded are reproduced while switching. This allows the user to understand the positional relationship of the partial image Ip in the entire image Ia more easily, and can reproduce these images more enjoyably.

The user can select between the recording of both of the partial image Ip and the entire image Ia and the recording of any one of the images. This allows the user to select the images to be recorded as needed, and therefore the usability of the imaging device 100 can be improved.

Embodiment 2

Referring to FIGS. 6 to 10, the following describes an imaging device 200 of Embodiment 2.

Since the imaging device 200 of Embodiment 2 has a configuration substantially similar to that of the imaging device 100 of Embodiment 1 other than the points in the following descriptions, their detailed descriptions are omitted.

Figure 6:
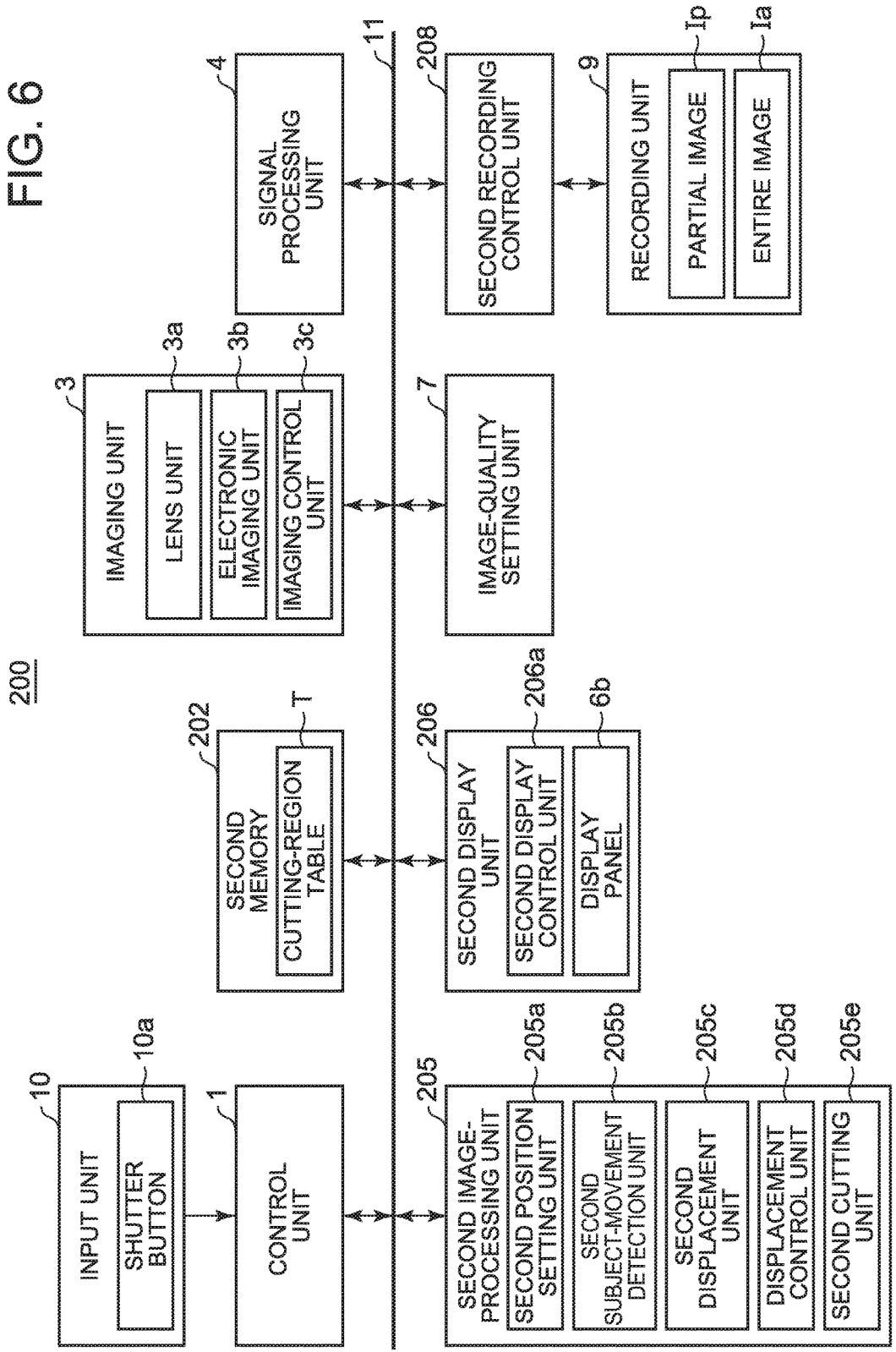
FIG. 6 is a block diagram schematically showing the configuration of an imaging device of Embodiment 2 of the present invention.

FIG. 6 is a block diagram schematically showing the configuration of the imaging device 200 of Embodiment 2 of the present invention.

As shown in FIG. 6, the imaging device 200 in Embodiment 2 specifically includes a control unit 1, a second memory 202, an imaging unit 3, a signal processing unit 4, a second image-processing unit 205, a second display unit 206, an image-quality setting unit 7, a second recording control unit 208, a recording unit 9, and an input unit 10.

Similarly to the first memory 2 in Embodiment 1, the second memory 202 includes a DRAM, for example, and temporarily stores data processed by the control unit 1, the second image-processing unit 205 and the like.

The second memory 202 records a cutting-region table T in which combinations of the size and the shape of the cutting region A (see FIG. 8A, for example) are specified. Specifically this cutting-region table T specifies a plurality of combinations of the size and the shape of the cutting region A where at least one of the size and the shape are changed.

A plurality of the size and the shape of the cutting region A are specified by changing the number of horizontal and vertical pixels of a region in which imaging is possible when a part of the region in the entire image Ia (see FIG. 10B) is zoomed-in on a predetermined scale for zooming by digital zooming or optical zooming, or by changing relative ratios of cutting region A horizontally and vertically relative to the number of horizontal and vertical pixels of the entire image Ia. For instance, examples of the shape of the cutting region A include a vertical-long shape (see FIG. 8A) and a horizontally-long shape (see FIG. 8B), and the cutting region table T specifies various sizes for each shape.

Figure 8A:
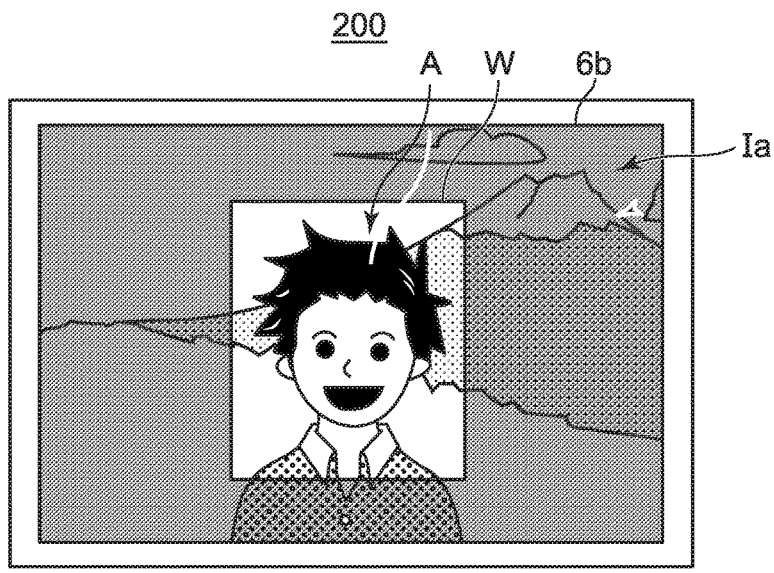
FIGS. 8A and 8B explain the shooting processing in FIG. 7.
Figure 8B:
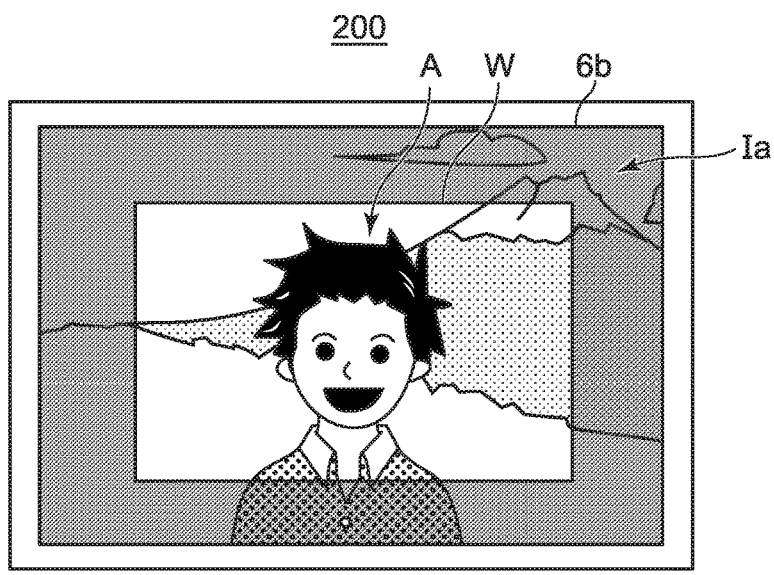

The size and the shape of the cutting region A illustrated in FIGS. 8A and 8B are given for illustration and are not intended to limit the invention, and they can be changed freely as needed. For instance, the shape of the cutting region A may be a circle or an ellipse, a polygon other than a rectangle, or other shapes such as a star-shape and a heart-shape. It may be any shape designated by the user based on a predetermined operation of the input unit 10, for example, as long as it surrounds a part of the region in the entire image Ia.

The second image-processing unit 205 includes a second position setting unit 205a, a second subject-movement detection unit 205b, a second displacement unit 205c, a displacement control unit 205d and a second cutting unit 205e.

Similarly to the first image-processing unit 5 of Embodiment 1, each unit of the second image-processing unit 205 includes a predetermined logic circuit, for example, and the configuration is given for illustration and is not intended to limit the invention.

The second position setting unit 205a sets a cutting region A at a predetermined position in the imaging range of the imaging unit 3.

That is, in the case where a predetermined shooting mode is set to associate a partial image Ip and the entire image Ia for recording, for example, the second position setting unit 205a sets the cutting region A at a predetermined position (e.g., substantially center) of the imaging range of the imaging unit 3 during displaying of the entire image Ia as the live-view image on the display panel 6b. The size and the shape of the cutting region A may be a size and a shape set as default in the cutting region table T or may be a size and a shape of the cutting region A that is set before.

Substantially similarly to the first position setting unit 5c in Embodiment 1, when a specific subject is detected in the angle of view by subject-recognition processing or the like, the second position setting unit 205a may set the cutting region A with reference to the position of the specific subject detected so that the specific subject is included in the cutting region A.

The second subject-movement detection unit 205b detects movement of a specific subject.

That is, the second subject-movement detection unit 205b detects relative movement of the specific subject with reference to the imaging range of the imaging unit 3 in the cutting region A set by the second position setting unit 205a.

Specifically, the second subject-movement detection unit 205b detects the specific subject from the cutting region A in the entire image Ia by subject-recognition processing similar to that in Embodiment 1, for example. Substantially similarly to the first subject-movement detection unit 5d in Embodiment 1, the second subject-movement detection unit 205b performs processing of YUV data of a plurality of frame images for live-view image (entire image Ia) created by the signal processing unit 4, such as the subject-recognition processing as stated above or mobile body tracking processing based on information for tracking of a specific subject detected once (e.g., feature points, brightness information, and color information) and thereby successively detects the specific subject from the cutting region A in each frame image. Thereby, the second subject-movement detection unit 205b successively detects the movement of the specific subject relative to the imaging range of the imaging unit 3 in the cutting region A.

The second displacement unit 205c displaces the position of the cutting region A.

That is, the second displacement unit 205c displaces the position of the cutting region A in this imaging range so as to track the movement of the specific subject in the imaging range of the imaging unit 3. Specifically, substantially similarly to the first displacement unit 5e in Embodiment 1, after halfway-pressing of the shutter button 10a by the user, the second displacement unit 205c displaces the position of the cutting region A in the imaging range of the imaging unit 3 in accordance with the relative movement of the specific subject detected by the second subject-movement detection unit 205b.

The displacement control unit 205d controls the displacement of the cutting region A.

That is, the displacement control unit 205d controls so that the position of the cutting region A is fixed to a predetermined position (e.g., substantially center) in the imaging range of the imaging unit 3 until the user presses the shutter button 10a halfway (first operation). Further, until the user presses the shutter button 10a halfway, the displacement control unit 205d may control so that at least one of the size and the shape of the cutting region A can be changed in response to a user's selection of a combination of the size and the shape as the user intends from a plurality of combinations of the size and the shape of the cutting region A that is specified in the cutting region table T, for example, through a predetermined operation (third operation) of the input unit 10 by the user while fixing the position of the cutting region A relative to the imaging range of the imaging unit 3 (see FIGS. 8A and 8B).

When the user presses the shutter button 10a halfway, the displacement control unit 205d controls the second displacement unit 205c to displace the position of the cutting region A so as to track the movement of the specific subject. When the user presses the shutter button 10a halfway, the displacement control unit 205d may control the second displacement unit 205c to displace the position of the cutting region A so as to track the movement of the specific subject while fixing the size and the shape of the cutting region A designated before the halfway-pressing operation of the shutter button 10a (see FIG. 9B).

The configuration such that the size and the shape of the cutting region A can be changed before the user presses the shutter button 10a halfway is given for illustration and is not intended to limit the invention. For instance, even after the user presses the shutter button 10a halfway, the size and the shape of the cutting region A can be changed, and when the user presses the shutter button fully (second operation), the size and the shape of the cutting region A may be fixed.

That is, when the user presses the shutter button 10a halfway, the position of the cutting region A is displaced so as to track the movement of the specific subject, meaning that the specific subject is always present in the cutting region A. Therefore, when the size of the cutting region A is changed to increase, for example, the specific subject is always present in the cutting region A. On the contrary, even when the size of the cutting region A is changed to decrease, at least a part of the specific subject is present in the cutting region A. Similarly, even when the area of the cutting region A decreases due to a change in shape of the cutting region A, at least a part of the specific subject is present in the cutting region A. Note here that for appropriate subject-recognition or mobile-body tracking processing by the second subject-movement detection unit 205b, there is a need to detect the specific subject again in the cutting region A changed in size or shape.

The second cutting unit 205e cuts the cutting region A from the entire image Ia.

Figure 10A:
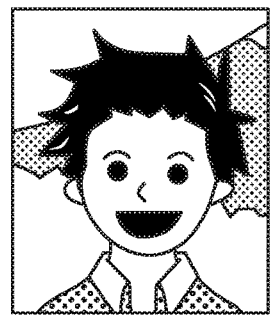
FIGS. 10A and 10B explain the shooting processing in FIG. 7.
Figure 10B:
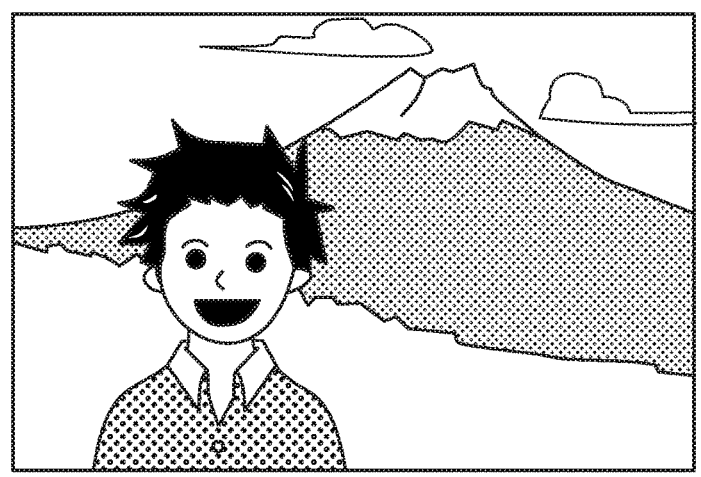

That is, substantially similarly to the first cutting unit 5a in Embodiment 1, when the user presses the shutter button 10a fully, following the halfway-pressing, the second cutting unit 205e acquires YUV data of the entire image Ia created by the signal processing unit 4 from the second memory 202, and cuts image data of a partial image Ip corresponding to the cutting region A in the entire image Ia (see FIG. 10A). That is, after the halfway-pressing of the shutter button 10a by the user, the displacement control unit 205d controls the second displacement unit 205c to displace the position of the cutting region A so as to track the movement of the specific subject, and when the user presses the shutter button 10a fully, the second cutting unit 205e cuts the partial image Ip corresponding to the cutting region A from the entire image Ia at the current position of the cutting region A in the imaging range of the imaging unit 3.

The second display unit 206 includes a second display control unit 206a and a display panel 6b.

Similarly to the first display control unit 6a in Embodiment 1, the second display control unit 206a controls to display a predetermined image on a display region of the display panel 6b in accordance with image data of a predetermined size that is read from the second memory 202 and the recording unit 9 and is decoded by the second image-processing unit 205. That is, the second display control unit 206a makes the display panel 6b display, as live-view image and at a predetermined reproduction frame rate, a plurality of frame images of the entire image Ia that are successively taken by the imaging unit 3 in the shooting mode of static images or moving images.

The second display control unit 206a makes the display panel 6b display, as live-view image, an image in the cutting region A that is set by the second position setting unit 205a.

Herein, the second display control unit 206a may be configured to display a frame W indicating the cutting region A in the entire image Ia that is successively displayed on the display panel 6b as the live-view image, so as to make the cutting region A recognizable. Specifically the user selects a desired combination of the size and the shape of the cutting region A from a plurality of combinations of the size and the shape of the cutting region A that is specified in the cutting region table T, for example, through a predetermined operation of the input unit 10 by the user (third operation) before the user presses the shutter button 10a halfway, i.e., before the size and the shape of the cutting region A are fixed. Then, the second display control unit 206a displays the frame W indicating the cutting region A having the size and the shape corresponding to the selected combination, so as to display the cutting region A recognizably in the entire image Ia.

Before the halfway-pressing of the shutter button 10a by the user, the second display control unit 206a applies masking at a region other than the cutting region A in the entire image Ia that is successively displayed on the display panel 6b, so as to display the image at the region other than the cutting region A in a semi-transparent manner (see FIG. 8A, for example). Thereby, the second display control unit 206a can display in a predetermined display mode so that the image at the other than the cutting region A is relatively less prominent than the partial image Ip corresponding to the cutting region A.

Figure 9A:
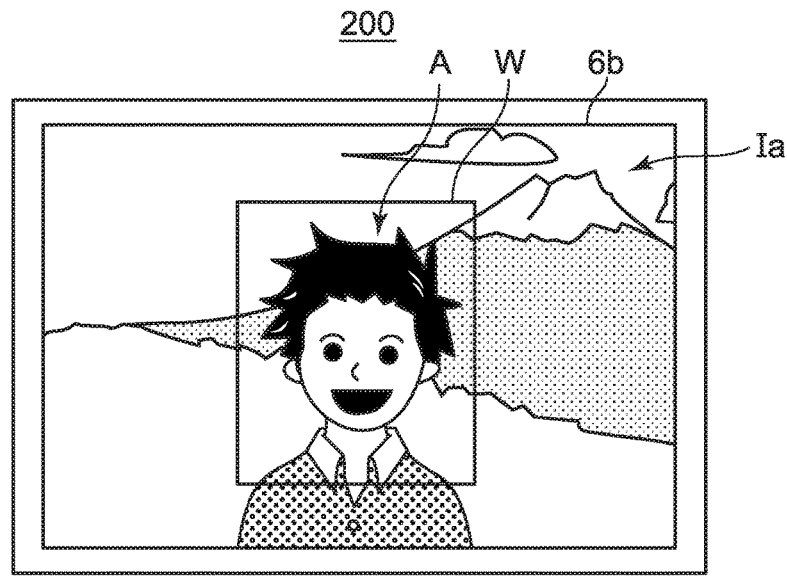
FIGS. 9A and 9B explain the shooting processing in FIG. 7.

When the user presses the shutter button 10a halfway so as to fix the size and the shape of the cutting region A, the second display control unit 206a cancels the displaying of the semi-transparent image at the region other than the cutting region A (see FIG. 9A). Thereby, the second display control unit 206a displays so that the frame W indicating the cutting region A whose size and the shape are fixed is displayed in the entire image Ia as the live-view image.

Such a semi-transparent image at the region other than the cutting region A is an example of the predetermined display mode of making the region other than the cutting region A less prominent, and this is given for illustration and is not intended to limit the invention. The display mode can be changed freely as needed. For instance, the second display control unit 206a may change the brightness, the chroma, or the tint of the image at the region other than the cutting region A, may apply mosaic processing or blurring to an image at the region other than the cutting region A, or may apply a mask image to the region other than the cutting region A to completely cover the region.

Similarly to the first display control unit 6a in Embodiment 1, when the user presses the shutter button 10a halfway, the second display control unit 206a may be configured to switch the live-view image that is successively displayed on the display panel 6b from the entire image Ia to the partial image Ip corresponding to the cutting region A cut by the second cutting unit 205e for displaying.

Similarly to the first display control unit 6a in Embodiment 1, when the partial image Ip is successively displayed on the display panel 6b as the live-view image, the second display control unit 206a may be configured so that the entire image Ia that is taken by the imaging unit 3 and is reduced in size can be displayed in a successively-synthesized manner at a predetermined position of the partial image Ip being displayed. Alternatively, the second display control unit 206a may be configured to display frame W indicating the position and the size of the cutting region A cut by the second cutting unit 205e in the entire image Ia that is reduced in size and is synthesized at a predetermined position of the partial image Ip.

Similarly to the first recording control unit 8 in Embodiment 1, when the user presses the shutter button 10a fully (second operation), following the halfway-pressing (first operation), the second recording control unit 208 records, in the recording unit 9, the partial image Ip (see FIG. 10A) corresponding to the cutting region A cut by the second cutting unit 205e in the entire image Ia taken by the imaging unit 3.

For instance, in the case where a predetermined shooting mode is set to associate the partial image Ip and the entire image Ia for recording (see FIG. 10B), the second recording control unit 208 associates the partial image Ip corresponding to the cutting region A cut by the second cutting unit 205e and the entire image Ia taken by the imaging unit 3, and records these images in the recording unit 9. Specifically, the second recording control unit 208 compresses the partial image Ip and the entire image Ia separately and records these images as different files in the recording unit 9, whereby these images can be reproduced and deleted independently. Note here that the partial image Ip and the entire image Ia may have the same file name, whereby these partial image Ip and entire image Ia are associated.

When motion-image information (not illustrated) including visual effects to dynamically switch from the partial image Ip to the entire image Ia is generated, the second recording control unit 208 may associate such motion-image information with the partial image Ip and the entire image Ia, and record them in the recording unit 9. That is, the second recording control unit 208 may record such motion-image information as a file different from those of the partial image Ip and the entire image Ia in the recording unit 9, but assign the same file name as those of the partial image Ip and the entire image Ia to such motion-image information, thereby associating such motion-image information with the partial image Ip and the entire image Ia.

<Shooting Processing>

Referring next to FIGS. 7 to 10B, the following describes shooting processing by the imaging device 200.

Figure 7:
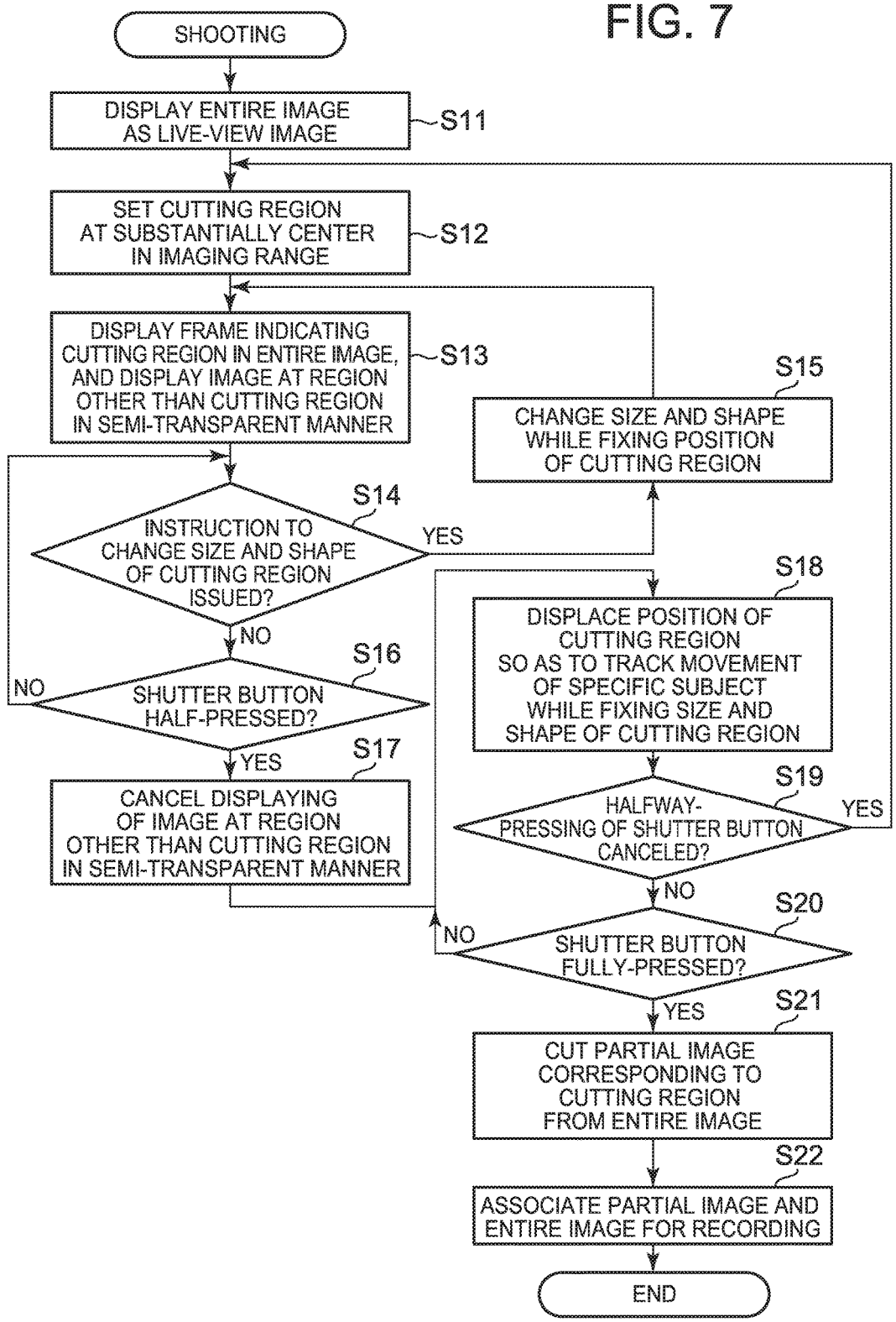
FIG. 7 is a flowchart showing one example of the operation in the shooting processing by the imaging device of FIG. 6.

FIG. 7 is a flowchart showing one example of the operation in the shooting processing. FIGS. 8A to 10B explain the shooting processing.

Similarly to the shooting processing in Embodiment 1, in the shooting processing in the following, the image-quality setting unit 7 sets the compression ratios (e.g., ½, ¼) of the partial image Ip and the entire image Ia beforehand. In the following shooting processing, a predetermined shooting mode is set to associate the partial image Ip and the entire image Ia for recording.

As shown in FIG. 7, the imaging unit 3 firstly starts imaging of a subject, and the second display control unit 206a makes the display panel 6b display live-view image based on image data for displaying a plurality of frame images of the entire image Ia created by the signal processing unit 4 (Step S11).

Next, the second position setting unit 205a sets a cutting region A of the size and the shape that are set as default in the cutting region table T, for example, at a substantially center of the imaging range of the imaging unit 3 (Step S12).

Then, the second display control unit 206*a* makes the display panel 6*b* display frame W indicating the cutting region A in the entire image Ia that is successively displayed, and applies masking to a region other than the cutting region A so that the image at the region other than the cutting region A is displayed in a semi-transparent manner (Step S13; see FIG. 8A).

Thereafter, the CPU of the control unit 1 determines whether an instruction to change the size and the shape of the cutting region A is input or not based on a predetermined operation of the input unit 10 by the user (Step S14). This determination is made based on whether any combination of the size and the shape is selected or not from a plurality of combinations of the size and the shape of the cutting region A that is specified in the cutting region table T, for example, through a predetermined operation (third operation) of the input unit 10 by the user.

When it is determined that an instruction to change the size and the shape of the cutting region A is input (Step S14; Yes), the displacement control unit 205*d* changes the size and the shape of the cutting region A in accordance with the instruction while fixing the position of the cutting region A relative to the imaging range of the imaging unit 3 to a substantially center (Step S15). Then, the CPU of the control unit 1 returns the processing to Step S13, and the second display control unit 206*a* makes the display panel 6*b* display the frame W indicating the cutting region A after the change so as to correspond to the change in the size and the shape of the cutting region A, and display the image at the region other than the cutting region A in a semi-transparent manner (see FIG. 8B).

When it is determined at Step S14 that an instruction to change the size and the shape of the cutting region A is not input (Step S14; No), the CPU of the control unit 1 determines whether the user presses the shutter button 10*a* of the input unit 10 halfway or not (Step S16).

When it is determined that the user does not press the shutter button 10*a* halfway (Step S16; No), the CPU of the control unit 1 returns the processing to Step S14, and similarly to the above, the CPU of the control unit 1 determines whether an instruction to change the size and the shape of the cutting region A is input or not.

When it is determined at Step S16 that the user presses the shutter button 10*a* halfway (Step S16; Yes), the second display control unit 206*a* cancels the displaying of the semi-transparent image at the region other than the cutting region A (Step S17; see FIG. 9A).

Figure 9B:
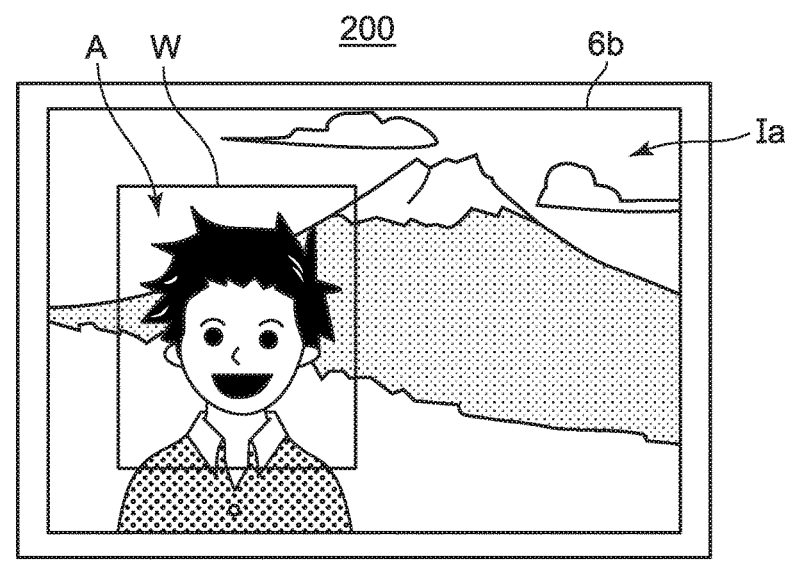

Then the displacement control unit 205*d* controls the second displacement unit 205*c* to displace the position of the cutting region A so as to track the movement of the specific subject while fixing the size and the shape of the cutting region A (Step S18; see FIG. 9B). Specifically, the second displacement unit 205*c* displaces the position of the cutting region A in the imaging range of the imaging unit 3 in accordance with the relative movement of the specific subject that is detected by the second subject-movement detection unit 205*b*. The second display control unit 206*a* displaces the frame W indicating the cutting region A in accordance with the displacement of the cutting region A and makes the display panel 6*b* display the frame W.

Next, the CPU of the control unit 1 determines whether the halfway-pressing of the shutter button 10*a* of the input unit 10 by the user is canceled or not (Step S19).

When it is determined at this step that the halfway-pressing of the shutter button 10*a* is not canceled (Step S19; No), the CPU of the control unit 1 determines whether the user presses the shutter button 10*a* of the input unit 10 fully or not (Step S20).

When it is determined at Step S20 that the user does not press the shutter button 10*a* fully (Step S20; No), the CPU of the control unit 1 returns the processing to Step S18, and similarly to the above, the displacement control unit 205*d* controls the second displacement unit 205*c* to displace the position of the cutting region A so as to track the movement of the specific subject while fixing the size and the shape of the cutting region A.

When it is determined at Step S20 that the user presses the shutter button 10*a* fully (Step S20; Yes), the second cutting unit 205*e* acquires, from the second memory 202, YUV data of the entire image Ia created by the signal processing unit 4 at the timing when the user presses the shutter button 10*a* fully, and cuts the partial image Ip corresponding to the cutting region A from the entire image Ia (Step S21; see FIG. 10A). During taking of the entire image Ia, the imaging control unit 3*c* may perform AF (automatic focusing), AE (automatic exposure), AWB (automatic white balance) and the like with reference to the cutting region A.

Thereafter, the second recording control unit 208 compresses the partial image Ip corresponding to the cutting region A cut by the second cutting unit 205*e* and the entire image Ia taken by the imaging unit 3 (see FIG. 10B) separately as different files, and associates these images and records them in the recording unit 9 (Step S22).

When it is determined at Step S19 that the halfway-pressing of the shutter button 10*a* is canceled (Step S19; Yes), the CPU of the control unit 1 returns the processing to Step S12, and the second position setting unit 205*a* sets a cutting region A of the size and the shape that are set before, for example (e.g., before cancellation of the halfway-pressing of the shutter button 10*a*) at a substantially center of the imaging range of the imaging unit 3. Thereafter the processing of Step S13 or later is performed similarly to the above.

As stated above, the imaging device 200 of Embodiment 2 is configured so that an image in the cutting region A is displayed on the display panel 6*b* as live-view image, specifically the cutting region A is displayed recognizably in the entire image Ia as the live-view image on the display panel 6*b*. Thereby, the user can easily understand the positional relationship of the partial image Ip corresponding to the cutting region A in the entire image Ia. The imaging device 200 is further configured so that the position of the cutting region A in the imaging range of the imaging unit 3 is fixed before the halfway-pressing of the shutter button 10*a* and in response to the halfway-pressing of the shutter button 10*a*, the position of the cutting region A in the imaging range is displaced in accordance with the relative movement of a specific subject so as to track the movement of the specific subject in the imaging range, and in response to the fully-pressing of the shutter button 10*a*, the partial image Ip corresponding to the cutting region A in the entire image A is recorded. With this configuration, before the halfway-pressing of the shutter button 10*a*, the cutting region including the specific subject as a target of cutting can be freely changed by a user when the user changes the imaging direction and the angle of view. After the halfway-pressing of the shutter button 10*a*, the position of the cutting region A can be displaced so as to track the relative movement of the specific subject even when the hand moves, the specific subject moves or the angle of view changes, and therefore the specific subject as a target of cutting can be easily changed, decided and tracked (fixed).

Especially before the user presses the shutter button 10a halfway, the size and the shape of the cutting region A can be changed while fixing the position of the cutting region A relative to the imaging range, whereby the size and the shape of the cutting region A including a specific subject as a target of cutting can be freely changed. Further, after the halfway-pressing of the shutter button 10a, the position of the cutting region A can be displaced so as to track the relative movement of the specific subject while fixing the size and the shape of the cutting region A as the user desires.

In this way, a user can use the digital zoom function of the imaging device 200 more easily.

When the user presses the shutter button 10a fully, the partial image Ip corresponding to the cutting region A and the entire image Ia taken at the same timing as that of the cutting of the cutting region A are associated for recording, whereby the user can understand the positional relationship of the partial image IP with the entire image Ia more easily.

Frame W indicating the cutting region A is displayed in the entire image Ia that is successively displayed on the display panel 6b as live-view image, whereby the cutting region A can be displayed recognizably in the entire image A, and therefore the user can understand the positional relationship of the partial image Ip corresponding to the cutting region A in the entire image Ia more easily. Especially before the halfway-pressing of the shutter button 10a, an image at a region other than the cutting region A in the entire image Ia that is successively displayed as live-view image is displayed in a predetermined display mode so that the image at the region becomes less prominent than the partial image Ip corresponding to the cutting region A, whereby the cutting region A becomes relatively prominent in the entire image Ia, and therefore the cutting region A can be displayed to be more easily recognizable.

When the user presses the shutter button 10a halfway, such a predetermined display mode so that the image at the region other than the cutting region A is displayed relatively less prominent than the partial image Ip corresponding to the cutting region A is canceled, whereby the angle of view of the entire image Ia can be adjusted more easily.

The imaging device 200 is configured so that, in response to a predetermined operation of the input unit 10 by the user that is performed before halfway-pressing of the shutter button 10a, any one of a plurality of combinations of the size and the shape of the cutting region A can be selected, and the cutting region A of the size and the shape corresponding to this combination is displayed recognizably in the entire image Ia as the live-view image. With this configuration, the size and the shape of the cutting region A including a specific subject as a target of cutting can be freely changed, and the cutting region A changed in the size and the shape can be displayed recognizably in the entire image Ia, whereby the user can understand the positional relationship of the partial image IP corresponding to the cutting region A in the entire image Ia more easily.

The present invention is not limited to Embodiments 1 and 2 as stated above, and may be improved and changed in design variously without departing from the scope of the present invention.

For instance, in Embodiments 1 and 2 as stated above, the partial image Ip and the entire image Ia are associated for recording, and this is given for illustration and is not intended to limit the invention as long as they are configured so that at least a partial image Ip is recorded.

In Embodiment 1 as stated above, live-view image displayed on the display panel 6b is switched from the entire image Ia to the partial image Ip after halfway-pressing of the shutter button 10a. This is given for illustration and is not intended to limit the invention. The partial image Ip may be displayed on the display panel 6b as live-view image regardless of the halfway-pressing operation of the shutter button 10a.

In Embodiments 1 and 2 as stated above, an instruction to decide or track (fix) a specific subject as a target of cutting and record an image thereof is issued by halfway-pressing and fully-pressing of the same shutter button 10a, whereby quick operation is enabled, including recording of an image. Alternatively, an instruction to decide or track (fix) a specific subject as a target of cutting may be issued by other operations not using the shutter button. For instance, the input unit 10 may include a touch panel (not illustrated) that is integrally formed with the display panel 6b. Then an instruction may be issued based on the number of touching with the touch panel. For example, the first touching may be the first operation and the following second touching may be the second operation.

In Embodiments 1 and 2 as stated above, an instruction to decide or track (fix) a specific subject as a target of cutting is issued by halfway-pressing of the shutter button 10a. Alternatively, when a face registered beforehand is used as a specific subject, such a face registered may be always decided and tracked (fixed) as the specific subject without any special operation by a user.

The configurations of the imaging device 100 and the imaging device 200 in Embodiments 1 and 2 as stated above are given for illustration, and are not intended to limit the present invention. For instance, recording means to record the partial image Ip and the entire image Ia may be provided at an external device, such as a server, and these images may be recorded by transmitting image data thereof to the external device via a communication network.

Embodiment 1 as stated above is configured so that the first cutting unit 5a, the first display control unit 6a, the first subject-movement detection unit 5d, the first displacement unit 5e, and the first recording control unit 8 are driven under the control of the control unit 1. This is not intended to limit the present invention. A predetermined program or the like may be executed by the CPU of the control unit 1.

That is, a program containing a cutting routine, a display control routine, a movement detection routine, a displacement routine, and a recording control routine is recorded in a program memory (not illustrated). Then, the cutting routine may make the CPU of the control unit 1 implement the function of cutting a part of region from the entire image Ia taken by the imaging unit 3 on the scale for zooming. The display control routine may make the CPU of the control unit 1 implement the functions of displaying the entire image Ia that is successively taken by the imaging unit 3 on the display panel 6b as live-view image, and of, in response to the first operation, switching the live-view image successively displayed on the display panel 6b from the entire image Ia to the partial image Ip corresponding to a part of the region cut from the entire image Ia. The movement detection routine may make the CPU of the control unit 1 implement the function of detecting relative movement of a specific subject to the angle of view taken by the imaging unit 3. The displacement routine may make the CPU of the control unit 1 implement the function of, after the first operation, displacing a cutting position of a part of the region to be cut in accordance with the relative movement of the specific subject detected. The recording control routine may make the CPU of the control unit 1 implement the function of, when a second operation different from the first operation is performed, recording a partial image Ip corresponding to the cut part of region.

Similarly, the cutting routine may make the CPU of the control unit 1 implement the function of successively cutting a part of region from the entire image Ia taken by the imaging unit 3 on the scale for zooming. The display control routine may make the CPU of the control unit 1 implement the function of successively displaying a partial image Ip corresponding to the part of region successively cut on the display panel 6*b* as live-view image. The movement detection routine may make the CPU of the control unit 1 implement the function of detecting relative movement of a specific subject to the angle of view taken by the imaging unit 3. The displacement routine may make the CPU of the control unit 1 implement the function of displacing a cutting position of a part of the region to be cut in accordance with the relative movement of the specific subject detected. The recording control routine may make the CPU of the control unit 1 implement the function of, when a predetermined operation is performed, recording a partial image Ip corresponding to the cut part of region, in which when a predetermined shooting mode is set, a partial image Ip corresponding to the cut part of region and the entire image Ia taken by the imaging unit 3 at the same timing as that of the cutting the part of region are associated for recording.

Embodiment 2 as stated above is configured so that the second display control unit 206*a*, the second position setting unit 205*a*, the second displacement unit 205*c*, the displacement control unit 205*d*, and the second recording control unit 208 are driven under the control of the control unit 1. This is not intended to limit the present invention. A predetermined program or the like may be executed by the CPU of the control unit 1.

That is, a program containing a setting routine, a regional-display control routine, a displacement routine, a displacement control routine, and a recording control routine is recorded in a program memory (not illustrated). Then, the setting routine may make the CPU of the control unit 1 implement the function of setting a cutting region A at a predetermined position in the imaging range of the imaging unit 3. The regional-display control routine may make the CPU of the control unit 1 implement the function of displaying an image in the set cutting region A on the display panel 6*b* as live-view image. The displacement routine may make the CPU of the control unit 1 implement the function of displacing the position of the cutting region A in the imaging range of the imaging unit 3 so as to track the movement of a specific subject in this imaging range. The displacement control routine may make the CPU of the control unit 1 implement the function of fixing the position of the cutting region A in the imaging range before a first operation, and in response to the first operation, displacing the position of the cutting region A. The recording control routine may make the CPU of the control unit 1 implement the function of, when a second operation is performed, following the first operation, recording a partial image Ip corresponding to the cutting region A in the entire image Ia taken by the imaging unit 3.

For a computer readable medium to store a program to execute the above processing, a ROM or a hard disk, a non-volatile memory such as a flash memory, a portable recording medium such as a CD-ROM may be used. For a medium to provide program data via a predetermined communication line, carrier waves may be used.

That is the descriptions on the embodiments of the present invention, and the scope of the present invention is not limited to the above embodiments and contains the scope of the invention recited in the claims and the scope of their equivalents.

In the embodiments as stated above, the control unit 1 (CPU) operates in accordance with various processing programs, thereby implementing (executing, configuring) a part or all of various functions (processing, means) required to achieve the various advantageous effects as stated above.

This, however, is given for illustration, and various other methods can be used to implement these functions.

For instance, a part or all of the various functions may be implemented by an electronic circuit, such as an IC or a LSI. In that case, the specific configuration of the electronic circuit is omitted because those skilled in the art could easily implement it based on the flowcharts or the functional block diagrams described in the specification (for instance, a determination processing involving the branching of the processing shown in the flowcharts can be configured by a comparator for a comparison of input data and a selector for switching based on a result of the comparison).

Any division into a plurality of functions (processing, means) required to achieve the various advantageous effects can be made, and the following describes one example.

(Configuration 1)

An imaging device includes: an imaging unit; a display unit; and a control unit. The control unit is configured to: set a first region of a predetermined size at a predetermined position in an imaging range of the imaging unit; make the display unit display an image in the first region as live-view image; fix a position of the first region in the imaging range before a first operation is performed; after the first operation is performed, displace the position of the first region in the imaging range so as to track movement of a specific subject in the imaging range; and when a second operation is performed, following the first operation, record a partial image corresponding to the first region in an entire image taken by the imaging unit.

(Configuration 2)

In the configuration as stated above, the control unit is configured to: make the display unit successively display an entire image that is successively taken by the imaging unit as the live-view image; during displaying the entire image as the live-view image, set the first region; and make the display unit display the first region recognizably in the entire image as the live-view image.

(Configuration 3)

In the configuration as stated above, the control unit is configured to: before the first operation is performed, allow at least one of a size and a shape of the first region to be changed while fixing the position of the first region relative to the imaging range, and when the first operation is performed, displace the position of the first region while fixing the size and the shape of the first region.

(Configuration 4)

In the configuration as stated above, the control unit is configured to: cut the first region from an entire image taken by the imaging unit; and when the second operation is performed, associate a partial image corresponding to the cut first region and the entire image taken by the imaging unit for recording.

(Configuration 5)

In the configuration as stated above, the control unit is configured to, when the first operation is performed, switch the live-view image successively displayed on the display unit from an entire image successively taken by the imaging unit to a partial image corresponding to the first region, the partial image being successively cut.

(Configuration 6)

In the configuration as stated above, the control unit is configured to: display, at a predetermined position of the partial image corresponding to the first region that is successively displayed on the display unit as the live-view image, an entire image taken by the imaging unit, the entire image being reduced in size and being successively synthesized; and display a frame in the entire image that is displayed at the predetermined position of the partial image while being reduced in size and being synthesized, the frame indicating a position and a size of the first region.

(Configuration 7)

In the configuration as stated above, the control unit is configured to display a frame indicating the first region in an entire image that is successively displayed on the display unit as the live-view image.

(Configuration 8)

In the configuration as stated above, the control unit is configured to, before the first operation is performed, display an image at a region other than the first region in an entire image that is successively displayed on the display unit as the live-view image so that the image at the region other than the first region is displayed in a predetermined display mode so as to be relatively less prominent than a partial image corresponding to the first region.

(Configuration 9)

In the configuration as stated above, the control unit is configured to, when the first operation is performed, display a frame indicating the first region having a fixed size and shape in an entire image as the live-view image, and cancel displaying of the image at the region other than the first region in the predetermined display mode.

(Configuration 10)

In the configuration as stated above, the control unit is configured to: specify a plurality of combinations of a size and a shape of the first region so that at least one of the size and the shape is changed; and in response to a third operation performed before the first operation, select any one of the plurality of combinations specified and display the first region of a size and a shape corresponding to the selected combination recognizably in an entire image as the live-view image.

(Configuration 11)

In the configuration as stated above, the control unit is configured to: detect movement of the specific subject in the first region relative to an imaging range of the imaging unit; and displace a position of the first region in the imaging range in accordance with the detected relative movement of the specific subject.

What is claimed is:

1. An imaging device comprising:
   an imaging unit including an image sensor;
   a display unit including a display panel; and
   a control unit including a CPU,
   wherein the control unit is configured to:
      make the display unit successively display an entire image that is successively taken by the imaging unit as a live-view image;
      during display of the entire image as the live-view image, set a cutting region at a predetermined position in an imaging range of the imaging unit;
      displace a position of the cutting region in the imaging range so as to track movement of a specific subject in the imaging range;
      fix the position of the cutting region in the imaging range before a first operation is performed, and when the first operation is performed, displace the position of the cutting region so as to track movement of the specific subject in the imaging range;
      at least before the first operation is performed, display an image at a region other than the cutting region in the entire image that is successively displayed on the display unit as the live-view image so that the image at the region other than the cutting region is displayed in a predetermined display mode so as to be relatively less prominent than a partial image corresponding to the cutting region;
      before the first operation is performed, allow at least one of a size and a shape of the cutting region to be changed while fixing the position of the cutting region relative to the imaging range; and
      when the first operation is performed, displace the position of the cutting region while fixing the size and the shape of the cutting region.

2. The imaging device according to claim 1,
wherein the control unit is further configured to:
   when a second operation is performed following the first operation, record the partial image corresponding to the cutting region in the entire image taken by the imaging unit.

3. The imaging device according to claim 2,
wherein the control unit is further configured to:
   cut the cutting region from the entire image taken by the imaging unit; and
   when the second operation is performed, associate the partial image corresponding to the cut cutting region and the entire image taken by the imaging unit for recording.

4. The imaging device according to claim 1,
wherein the control unit is further configured to:
   when the first operation is performed, switch the live-view image successively displayed on the display unit from the entire image successively taken by the imaging unit to the partial image corresponding to the cutting region, the partial image being successively cut.

5. The imaging device according to claim 1,
wherein the control unit is further configured to:
   display, at a predetermined position of the partial image corresponding to the cutting region, the entire image taken by the imaging unit, the entire image being reduced in size and being successively synthesized, and
   display a frame in the entire image that is displayed at the predetermined position of the partial image while being reduced in size and being synthesized, the frame indicating the position and the size of the cutting region.

6. The imaging device according to claim 1,
wherein the control unit is further configured to:
   display a frame indicating the cutting region in the entire image that is successively displayed on the display unit as the live-view image.

7. The imaging device according to claim 1,
wherein the control unit is further configured to:
   when the first operation is performed, display a frame indicating the cutting region having the fixed size and shape in the entire image, and cancel display of the image at the region other than the cutting region in the predetermined display mode.

8. The imaging device according to claim 1,
wherein the control unit is further configured to:

detect movement of the specific subject in the cutting region relative to the imaging range of the imaging unit, and displace the position of the cutting region in the imaging range in accordance with the detected relative movement of the specific subject.

9. The imaging device according to claim 1, wherein the control unit is further configured to:

specify a plurality of combinations of size and shape of the cutting region so that at least one of the size and the shape is changed, and in response to a third operation performed before the first operation, select any one of the plurality of combinations specified and display the cutting region with a size and a shape corresponding to the selected combination recognizably in the entire image.

10. An imaging method by an imaging device comprising an imaging unit including an image sensor, and a display unit including a display panel, the method comprising:

making the display unit successively display an entire image that is successively taken by the imaging unit as a live-view image;

during display of the entire image as the live-view image, setting a cutting region at a predetermined position in an imaging range of the imaging unit;

displacing a position of the cutting region in the imaging range so as to track movement of a specific subject in the imaging range;

fixing the position of the cutting region in the imaging range before a first operation is performed, and when the first operation is performed, displacing the position of the cutting region so as to track movement of the specific subject in the imaging range;

at least before the first operation is performed, displaying an image at a region other than the cutting region in the entire image that is successively displayed on the display unit as the live-view image so that the image at the region other than the cutting region is displayed in a predetermined display mode so as to be relatively less prominent than a partial image corresponding to the cutting region;

before the first operation is performed, allowing at least one of a size and a shape of the cutting region to be changed while fixing the position of the cutting region relative to the imaging range; and when the first operation is performed, displacing the position of the cutting region while fixing the size and the shape of the cutting region.

11. A non-transitory recording medium including a program recorded therein for controlling a computer of an imaging device comprising an imaging unit including an image sensor and a display unit including a display panel, the program controlling the computer of the imaging device to perform operations including:

making the display unit successively display an entire image that is successively taken by the imaging unit as a live-view image;

during display of the entire image as the live-view image, setting a cutting region at a predetermined position in an imaging range of the imaging unit;

displacing a position of the cutting region in the imaging range so as to track movement of a specific subject in the imaging range;

fixing the position of the cutting region in the imaging range before a first operation is performed, and when the first operation is performed, displacing the position of the cutting region so as to track movement of the specific subject in the imaging range;

at least before the first operation is performed, displaying an image at a region other than the cutting region in the entire image that is successively displayed on the display unit as the live-view image so that the image at the region other than the cutting region is displayed in a predetermined display mode so as to be relatively less prominent than a partial image corresponding to the cutting region;

before the first operation is performed, allowing at least one of a size and a shape of the cutting region to be changed while fixing the position of the cutting region relative to the imaging range; and when the first operation is performed, displacing the position of the cutting region while fixing the size and the shape of the cutting region.

* * * * *